United States Patent [19]

Wu et al.

[11] Patent Number: 5,278,852
[45] Date of Patent: Jan. 11, 1994

[54] INTRA-CAVITY HIGH ORDER HARMONIC LASER

[75] Inventors: Ruikun Wu; He Huiuan; He Jianrong, all of Shanghai, China

[73] Assignee: Kigre, Inc., Hilton Head Island, S.C.

[21] Appl. No.: 773,482

[22] Filed: Oct. 9, 1991

[30] Foreign Application Priority Data

Oct. 11, 1990 [CN] China ............... 90 1 02955.6

[51] Int. Cl.$^5$ ............................................. H01S 3/10
[52] U.S. Cl. ............................................. 372/22; 372/23
[58] Field of Search ................. 372/22, 23; 359/329

[56] References Cited

U.S. PATENT DOCUMENTS

| | | | |
|---|---|---|---|
| 4,331,891 | 5/1982 | Rizzo | 359/329 |
| 4,386,428 | 5/1983 | Baer | 372/22 |
| 4,866,720 | 9/1989 | Holly | 372/22 |
| 4,879,722 | 11/1989 | Dixon et al. | |
| 4,879,723 | 11/1989 | Dixon et al. | |
| 5,025,446 | 6/1991 | Kuizenga | 359/329 |
| 5,047,668 | 9/1991 | Bosenberg | 359/330 |

FOREIGN PATENT DOCUMENTS

0126242  5/1990  Japan .................... 359/329

OTHER PUBLICATIONS

*Amoco Heads for The Wild Blue Yonder*, Oct. 1990, Lasers & Optronics by Richard Cummingham, Executive Editor.

*Vixible Solid-State Laser*, Jan., 1988, Laser Focus/Electro-Optics, by Gary T. Forrest.

*20 Watt Average-Power KTP Intracavity Doubled ND:YAG Laser*, J.P.O.S.A., vol. 4 No. 7, Jan. 1987, (author unknown).

*Primary Examiner*—Rodney B. Bovernick
*Assistant Examiner*—Robert E. Wise
*Attorney, Agent, or Firm*—Howard & Howard

[57] ABSTRACT

An intra-cavity high order harmonic laser consists of a output coupler, total reflection mirror, and a laser medium disposed therebetween. The output coupler and the total reflection mirror form a resonator. At least two nonlinear crystals are disposed between the laser medium and the output coupler. One of the crystals acts as a frequency doubler, doubling the fundamental frequency of the laser and the other crystal acts as a frequency mixer or high order harmonic doubler in order to produce higher nth order harmonic ($n \geq 2$). The invention overcomes the disadvantages associated with producing a high order harmonic laser beam in low peak power lasers such as CW lasers.

59 Claims, 2 Drawing Sheets

INTRA-CAVITY HIGH ORDER HARMONIC LASER

BACKGROUND OF THE INVENTION

The present invention relates generally to solid state lasers and more specifically to a method and apparatus for generating high order harmonics within a laser resonator by inserting several nonlinear crystals.

Although techniques for intra-cavity frequency doubling are well known (for example, see "20 W average-power KTP intra-cavity-doubled Nd:YAG laser" J.O.S.A. Vol 4 No 7, 1987), such techniques produce only second order harmonics.

In a paper entitled "Recent developments in barium borate" by Prof. Chen Chuangtian, a technique is disclosed using a nonlinear crystal outside of a laser resonator to obtain high order harmonic output. The method is shown in FIG. 1 in which (1) is the output coupler mirror of the laser; (5) is the laser active medium, Nd:YAG; (6) is the Q switch; and (7) is the total reflection mirror. Outside of the laser resonator (16), is a frequency doubling crystal (13). If the crystal (14) acts as frequency mixing or quadrupling medium, then third or fourth harmonics could be obtained. However, in practice useful power levels have been successfully obtained only in high peak power pulse laser systems. In a CW Nd:YAG laser, or low peak power pulse laser system, the output of the third or fourth harmonic will be very small when applying the above-referenced methodology, because in low peak power systems, the nonlinear frequency converting process is extremely inefficient, even though no high order harmonic is produced.

It is the principle object of the present invention to overcome the disadvantages set out above, and to provide a method and apparatus which is suitable for producing high order harmonics in CW or low peak power pulse lasers.

The present invention achieves this object by using at least two nonlinear crystals within the resonating laser cavity. By constructing a laser in this way, the nonlinear crystals operate on the fundamental laser beam present within the resonating cavity (which is one to two orders of magnitude higher than the fundamental beam outside of the cavity). By accessing, and operating on, and fundamental laser beam within the resonating cavity, the frequency conversion efficiency is increased, thereby giving rise to the generation of more powerful harmonic frequencies.

According to the invention, nonlinear crystals are inserted in the laser resonator in order to obtain third, fourth or even higher harmonic output. In the system of the present invention, the laser consists of total reflection mirror, output coupler mirror, laser active medium, Q switch and at least two nonlinear crystals. Q switch is located between the laser active medium and the total reflection mirror. There are N nonlinear crystals ($N \geq 2$) between the laser active medium and the output coupler mirror. Among them, the crystal which is nearest to the laser active medium is a frequency doubling crystal which converts the fundamental wavelength to the second harmonic wavelength. The other (N−1) crystals act as frequency mixing or frequency doubling devices depending on the desired harmonic to be output.

The laser active medium could be, but is not limited to, Nd:YAG, Nd:YLF, Nd:YAP, each of which generates a unique wavelength. When N=2 (meaning that only two crystals are present in the laser cavity), for a fundamental frequency F having wavelength W, the first crystal, which is the nearest to the laser active medium, acts to double the fundamental frequency, and the second crystal acts as a frequency mixing medium. This process is respectively expressed as:

$$F \rightarrow 2F \quad (1)$$

$$F + 2F \rightarrow 3F \quad (2)$$

When N=3, it denotes that a third crystal is inserted in the laser cavity and acts as a frequency mixer and the process is expressed as:

$$F + 3F \rightarrow 4F \quad (3)$$

The process for a fourth crystal is expressed as:

$$F + 4F \rightarrow 5F \quad (4)$$

Both Type I and Type II phase match methods can be used to realize each of the above processes for frequency doubling and mixing.

Accordingly, for the Nth crystal inserted in the laser cavity, the (N+1)th harmonic is obtained.

Almost any nonlinear crystals can be used in above-mentioned process as frequency doubling and mixing devices, for example, but not limited to, KDP, KD*P, LiNbO3, MgO:LiNbO3, KNbO3, BBO, LBO, and MtiO(XO4) (where M is potassium, rubidium, titanium, and X is phosphorous or arsenic). Once the proper crystal is chosen, the working angle for the crystal is worked out according to the corresponding process (1)-(4) and known phase match methods.

In order to further increase the conversion efficiency of above nonlinear process, subresonator mirrors which have high reflectivity for certain harmonic frequency are inserted in the resonator.

One important advantage of the present invention is that the power density of the fundamental wavelength inside the resonator, is typically 1 to 2 times greater than the magnitude outside of the resonator. When a nonlinear crystal is inserted in the resonator, the conversion efficiency of the nonlinear process is greatly increased by the intense fundamental laser beam inside the resonator. By this means, the CW high order harmonic output is realized. This method is also applicable in low peak power pulse laser system to further increase the output of the high order harmonic laser beam.

DETAILED DESCRIPTION OF THE PREFERRED EMBODIMENTS

Throughout the disclosure, the following definitions apply:

DEFINITIONS

BBO—The Crystal of B Borate (Barium metaborate)
KTP—The Crystal of potassium titanyl phosphate
THG—Thid Harmonic Generation
SHG—Second Harmonic Generation
OPO—Optical Parametric Oscillation
OPO—Optical Parametric Amplification
CW—Continuous Wave
MI—Mirror 1
o Ray—Ordinary Ray
e Ray—Extraordinary Ray Type I Phase match condition means: A first beam with o ray plus a second beam with o ray produce a third beam with e ray.

Type II match condition means: A first beam with o ray plus a second beam with e ray produce a third beam with e ray.

Figure 1:
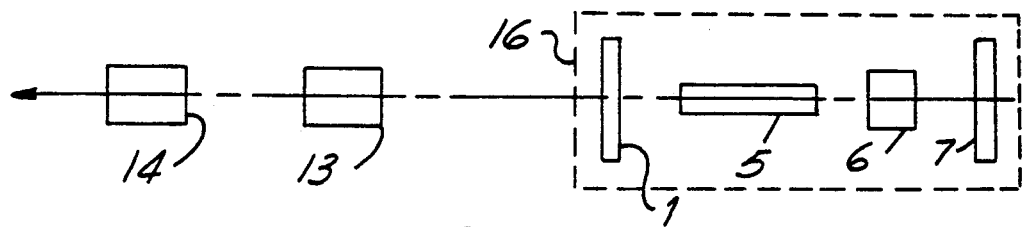
FIG. 1 illustrates a known method which produces third harmonic outside of the laser resonator.
Figure 2:
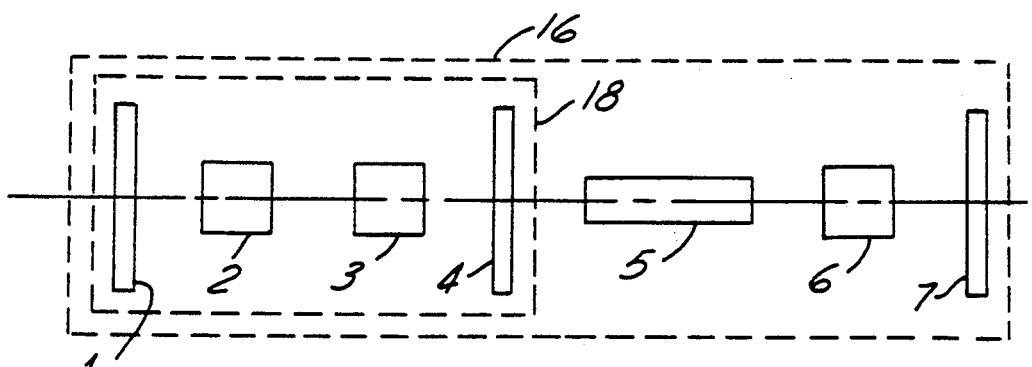
FIG. 2 illustrates an embodiment of the present invention for N=2.

Referring now to FIG. 2, one embodiment of the laser resonator of the present invention consists of output coupler mirror (1) and total reflection mirror 7. Element (6) is a Q switch, which has a frequency of modulation from 0.5 to 20 KHZ, and can withstand a high power density laser beam without damage. Element (5) is laser active medium, for example, Nd:YAG (having a fundamental wavelength of 1.064 um). Elements (2) and (3) are nonlinear crystals. There are many combinations of crystals (2) and (3) which will perform satisfactorily, for example, crystal (3) consists of KTP with a cutting direction for Type II phase match of 1.06 um doubling ($\theta=90°$, $\phi=23°$) and crystal (2) consists of BBO with cutting direction for Type II or Type I phase match condition of frequency mixing ($\theta=38°$ for Type II, $\theta=32°$ for Type I). In this case, the nonlinear processing occurs in crystal (3) and crystal (2) respectively as follows:

|            | 1.064 e + 1.064 o → 0.532 e | (1)  |
|------------|------------------------------|------|
| Type II $\theta = 38°$ | 1.064 e + 0.532 o → 0.355 e | (2)  |
| Type I $\theta = 32°$  | 1.064 o + 0.532 o → 0.355 e | (2') |

In above expressions 1.064 equals the wavelength 1.064 um. The 1.064 e designates a laser beam having a wavelength 1.064 um and being polarized as an extraordinary beam.

Combinations of crystal (2) and crystal (3) as referred to above have produced high power outputs of 0.355 UV wavelength. From equations (1), (2), and (2'), both processes of frequency doubling and mixing are related to the fundamental wavelength of Nd:YAG laser active medium (1.064 um). Inside of the laser resonator (16), the power density of a 1.064 um laser beam is 10 to 100 times higher than outside of the laser resonator and therefore the output power of the second harmonic 0.532 um and third harmonic 0.355 um is much greater than that achievable using nonlinear crystals outside of the resonator (16).

If the combination of crystal (3) and crystal (2) is changed, for example, the BBO with $\theta=48°$ is used for crystal (2), then the process (2) becomes:

0.532 o + 0.532 o → 0.266 e

In this case, a fourth harmonic of 1.064 um is obtained.

The characteristics of the output coupler mirror (1) is chosen according to the particular design at hand. For example, if only the second harmonic is needed, then only crystal (3) is used in the resonator, and the output coupler mirror must have a high reflectivity up to 1.064 um and thereafter it must have a very high transmission characteristic (up to the second harmonic 0.532 um).

Laser medium (5) may be pumped (longitudinally or transversely) with any conventional pumping source and is not limited to conventional lamp pumping systems. Accordingly, diodes, diode arrays, and lasers could be used as pumps. If diodes, diode arrays, or lasers are used as longitudinal pumping sources, the following operation would occur in the first crystal (crystal (3)):

a) $F_1 + F_p \rightarrow F_2$ (when first crystal operates as a mixer)
b) $F_p + F_p \rightarrow F_2$ (when first crystal operates as a doubler)

and in the second crystal (crystal (2) in FIG. 2 the following mixing operations can be made to occur depending upon the orientation of the second crystal:

a) $F_2 + F_1 \rightarrow F_3$
b) $F_2 + F_p \rightarrow F_3$
c) $|F_2 - F_1| \rightarrow F_3$ Where:

$F_1$ is the fundamental frequency defined by the laser medium.

$F_2$ is the frequency output by the first crystal (crystal (3)).

$F_3$ is the frequency output by the second crystal (crystal (2)).

$F_p$ is the frequency of the diode, diode arrays, or laser pump.

If a third harmonic 0.355 um is desired, as shown in FIG. 2, mirror (1) must have a high reflectivity for both 1.06 um and 0.532 um wavelengths and a high transmission characteristic for light having a 0.0355 um wavelength.

For the output of a fourth harmonic, the output coupler mirror (1) ideally should have high transmission for the 0.266 um harmonic, and also possess a high reflectivity for 1.064 um, and 0.532 um wavelengths.

In FIG. 2, mirror (4) in conjunction with mirror (1) forms subresonator (18). Subresonator (18) further increases the nonlinear converting efficiency. The subresonator (18) has resonance of 0.532 um which raises the power density of the 0.532 um wavelength but requires mirror (4) to have a very high transmission of 1.06 um while maintaining a high reflectivity to harmonic frequencies.

Figure 3:
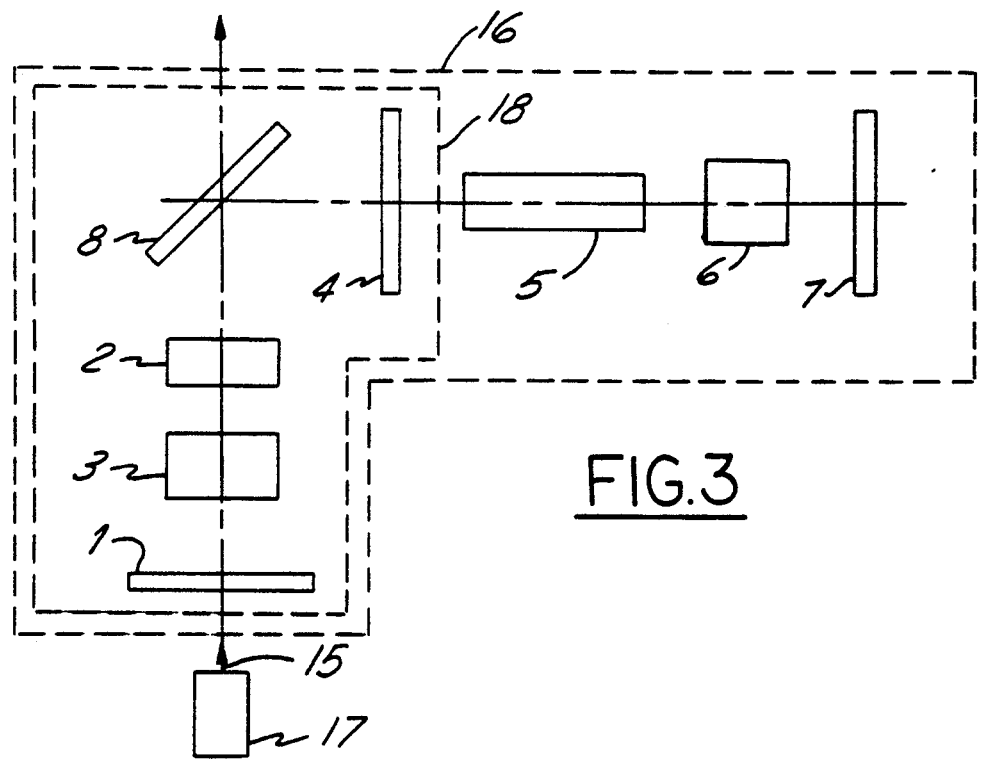
FIG. 3 shows an alternate embodiment of the present invention in which N=2.

The working principle of the embodiment disclosed in FIG. 3 is essentially the same as that of FIG. 2 except mirror (1) is totally reflective and mirror (8) acts to direct light between mirrors (1) and (7) while also acting as an output coupler. Mirror (8) should be as reflective as possible to the fundamental wavelength and correspondingly should be highly transmissive to the harmonic frequency which is to be generated and output. Mirror (1) should possess high transmission characteristics for the wavelength of pump beam (15) emitted from pump (17).

As shown in FIG. 3, a double scheme is used to obtain a second harmonic. The fundamental laser beam traverses crystal (3) twice thereby producing an intensified second harmonic in crystal (3). This 0.532 um wavelength is then mixed with 1.064 um in crystal (2), thereby yielding the third harmonic output 0.355 um. When subresonator mirror (4) is inserted into the laser resonator (16), it forms subresonator (18) with mirror (1) and further increases the intensity of second harmonic.

Figure 4:
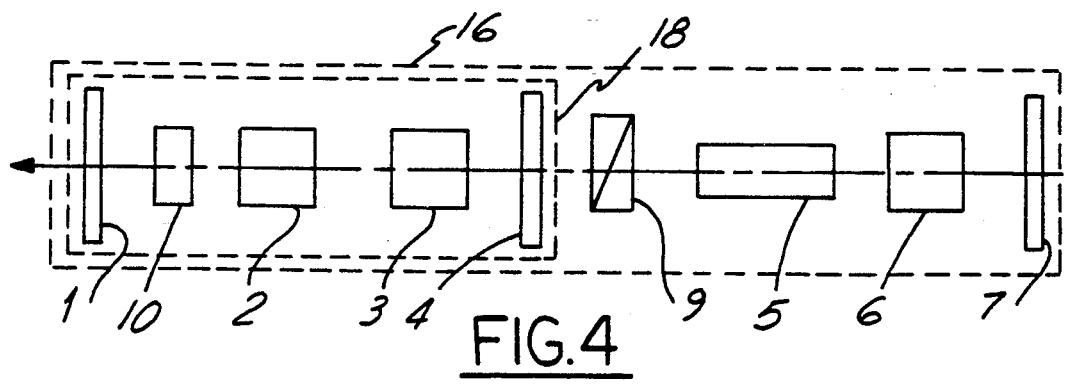
FIG. 4 is the third embodiment of the present invention for N=2.

The working principle of the apparatus of FIG. 4 is substantially similar to that of FIG. 2 except polarizer (9) and quarter wave plate (10) are inserted in the resonator (16) in order to reduce depolarization losses in the resonator which are caused by the birefringence of crystals (2), (3). It is to be understood that, although it is advantageous to use subresonator (18) to increase the higher harmonic power output, it is not necessary, and, accordingly, the laser of the present invention can be used with or without a subresonator.

Figure 5:
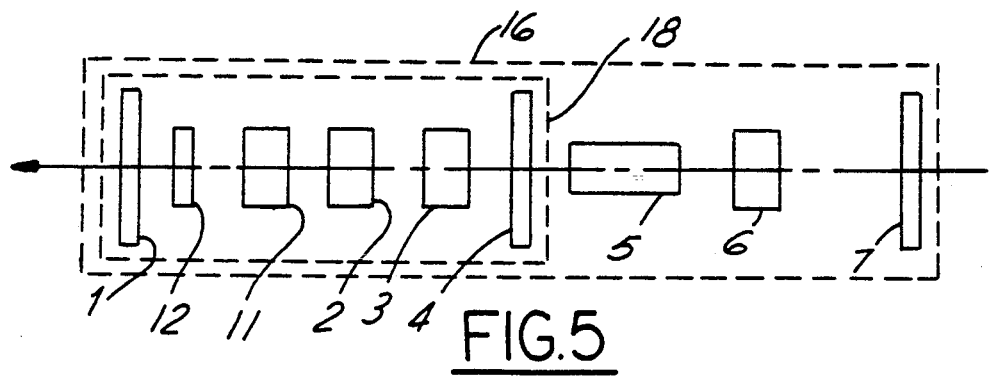
FIG. 5 is the fourth embodiment of the present invention for N=3.

Now referring to FIGS. 2 and 5, the embodiment of FIG. 5 includes that disclosed in FIG. 2 with the addition of crystal (11) and crystal (12). The use of crystals (11) and (12) in this manner permit the realization of an output which is higher in harmonic order than that achievable with the system of FIG. 2. When only crystal (11) is used without crystal (12), there are two choices for crystal (11). These two choices are as follows:

1. Crystal (11) is a BBO crystal with cut direction for frequency mixing of $\theta=40.3°$ or $\theta=46.6°$. The nonlinear processing in the crystal is as follows:

$$1.064\ o + 0.355\ o \rightarrow 0.266\ e\ (\text{Type I } \theta=40.3°) \quad (3)$$

$$1.064\ e + 0.355\ o \rightarrow 0.266\ e\ (\text{Type II } \theta=46.6°) \quad (3')$$

Both methods yield a fourth harmonic output.

2. Crystal (11) is a BBO crystal with cut direction of $\theta=69.6°$ for Type I frequency mixing as the following:

$$0.532\ o + 0.355\ o \rightarrow 0.213\ e$$

This method obtains a fifth harmonic.

When both crystals (11) and (12) are located in the laser resonator, crystal (11) selected as BBO with cutting angle $\theta=40.3°$ or $\theta=46.6°$ and crystal (12) also selected as BBO with cutting angle $\theta=51.1°$ or $\theta=57.2°$, then a fifth harmonic could be also obtained from the following process:

$$1.06\ o + 0.266\ o \rightarrow 0.213\ e\ (\text{Type I } \theta=51.1°) \quad (4)$$

$$1.06\ e + 0.266\ o \rightarrow 0.213\ e\ (\text{Type II } \theta=57.2°) \quad (4')$$

The above processes (1), (2), (3), and (4) can be extended to generate any number of harmonics by inserting n crystals in the resonator to obtain the (N+1)th harmonic. Of course, in practice, losses associated with the crystals and resonator pose some upper limitation on n.

It will be well understood by those skilled in the art that the crystals which are described herein and labeled (2), (3), (11), and (12) could be replaced by any number of well known nonlinear crystals.

Figure 6:
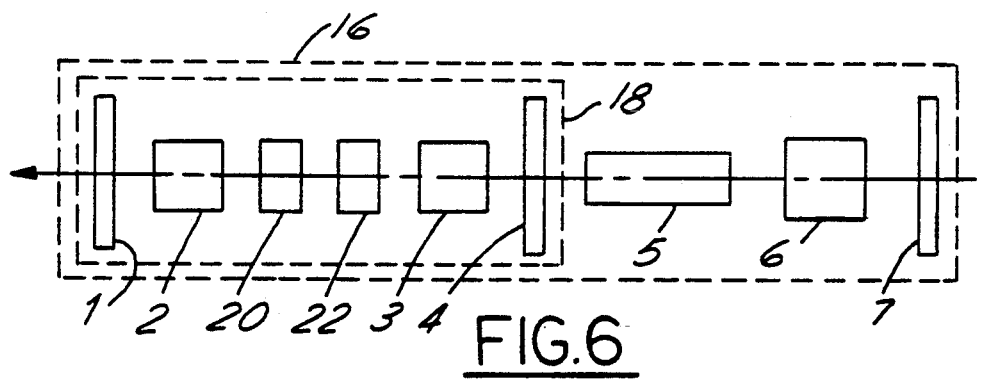
FIG. 6 is the fifth embodiment of the present invention using a polarization rotator and a recombiner.
Figure 7:
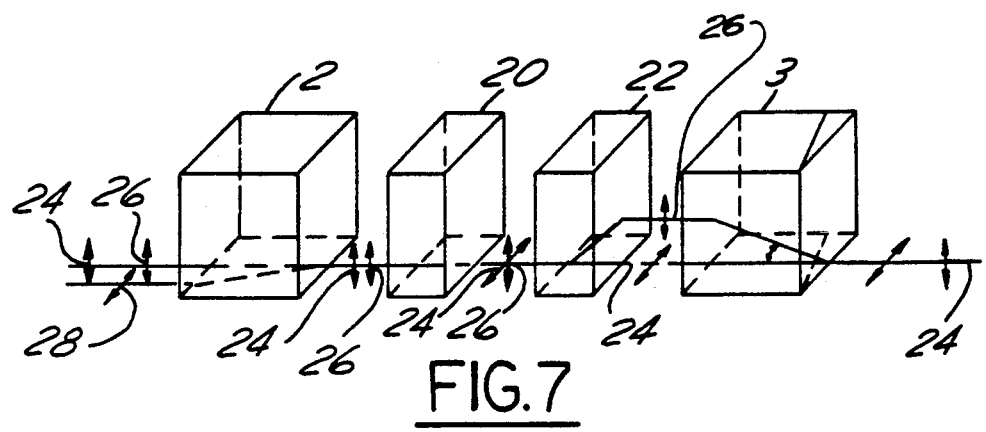
FIg. 7 is a diagrammatic view of selected components from FIG. 6 showing their interaction with several intra-cavity laser beams.

Now referring to FIGS. 6 and 7, in still a further embodiment of the present invention, the embodiment of FIG. 2 is modified by inserting polarization rotator (20) and beam recombiner (22) between nonlinear crystals (2) and (3) to yield the embodiments set forth in FIG. 6. It is well understood to those skilled in the art that, depending upon the nature of the materials selected and the desired results, the primary beam (24) may become separated from the second harmonic (26). Likewise, in some cases, the relative polarization of beams (24), (26) will be improper for producing third harmonic generation. In this case, polarization rotator (20) and beam recombiner (22) act to properly align beams (24) and (26) while maintaining the proper polarization for each of the beams.

The foregoing detailed description shows that the preferred embodiments of the present invention are well suited to fulfill the objects of the invention. It is recognized that those skilled in the art may make various modifications or additions to the preferred embodiments chosen here to illustrate the present invention, without departing from the spirit of the present invention. For example, various materials other than those which have been disclosed herein, may be suitable for performing the nonlinear relations herein disclosed. Accordingly, it is to be understood that the subject matter sought to be protected hereby should be deemed to extend to the subject matter defined in the appended claims, including all fair equivalents thereof.

We claim:

1. An intra-cavity high order harmonic laser comprising:

a mirror, an output coupler, and a laser medium, said laser medium optically disposed between said mirror and said output coupler, said mirror, output coupler, and said laser medium forming a resonating cavity for supporting lasing, said laser medium generating a first laser beam having a fundamental frequency, and first and second nonlinear crystals disposed within said resonating cavity, said first nonlinear crystal residing between said laser medium and said second nonlinear crystal, said first nonlinear crystal adapted to interact with said first laser beam thereby generating a second laser beam having a harmonic frequency twice that of said fundamental frequency of said first laser beam, said second nonlinear crystal mixing said second laser beam with said first laser beam thereby generating a third laser beam having a harmonic frequency three times that of said fundamental frequency.

2. The laser of claim 1, further including a modulator disposed within said resonating cavity.

3. The laser of claim 2, further including a polarization rotator and a beam recombiner optically disposed within said resonating cavity.

4. The laser of claim 1, wherein said second nonlinear crystal is optically disposed between said first nonlinear crystal and said laser medium and wherein said first nonlinear crystal is disposed between said second nonlinear crystal and said output coupler.

5. The laser of claim 4, further including a subresonating mirror optically disposed between said second nonlinear crystal and said laser medium.

6. The laser of claim 5, wherein said subresonating mirror, in conjunction with said output coupler, forms a subresonating cavity within said resonating cavity, and wherein said subresonating mirror is adapted to transmit said first laser beam and wherein said subresonating mirror is adapted to reflect said second laser beam.

7. The laser of claim 5, further including a polarizer disposed between said laser medium and said subresonating mirror.

8. The laser of claim 5, further including a quarter wave plate disposed between said output coupler and said laser medium.

9. The laser of claim 1, further including a subresonating mirror optically disposed between said second nonlinear crystal and said laser medium.

10. The laser of claim 9, further including a polarizer disposed between said laser medium and said subresonating mirror.

11. The laser of claim 9, further including a quarter wave plate disposed between said output coupler and said laser medium.

12. An intra-cavity high order harmonic laser comprising:

a mirror, an output coupler, and a laser medium, said laser medium optically disposed between said mirror and said output coupler, said mirror, output coupler, and said laser medium forming a resonating cavity for supporting lasing, said laser medium generating a first laser beam having a fundamental frequency, and first and second nonlinear crystals disposed within said resonating cavity, wherein said first nonlinear crystal is adapted to act upon said first laser beam thereby generating a second laser beam having a harmonic frequency twice that of said fundamental frequency of said first laser beam, and wherein said second nonlinear crystal is adapted to operate on said second laser beam to generate a third laser beam having a harmonic frequency four times that of said fundamental frequency.

13. The laser of claim 12, further including a modulator disposed within said resonating cavity.

14. The laser of claim 13, further including a polarization rotator and a beam recombiner optically disposed within said resonating cavity.

15. The laser of claim 12, wherein said second nonlinear crystal is optically disposed between said first nonlinear crystal and said laser medium and wherein said first nonlinear crystal is disposed between said second nonlinear crystal and said output coupler.

16. The laser of claim 15, further including a subresonating mirror optically disposed between said second nonlinear crystal and said laser medium.

17. The laser of claim 16, wherein said subresonating mirror, in conjunction with said output coupler, forms a subresonating cavity within said resonating cavity, and wherein said subresonating mirror is adapted to transmit said first laser beam and wherein said subresonating mirror is adapted to reflect said second laser beam.

18. The laser of claim 16, further including a polarizer disposed between said laser medium and said subresonating mirror.

19. The laser of claim 16, further including a quarter wave plate disposed between said output coupler and said laser medium.

20. The laser of claim 12, further including a subresonating mirror optically disposed between said second nonlinear crystal and said laser medium.

21. The laser of claim 20, further including a polarizer disposed between said laser medium and said subresonating mirror.

22. The laser of claim 20, further including a quarter wave plate disposed between said output coupler and said laser medium.

23. An intra-cavity high order harmonic laser comprising:

a mirror, an output coupler, and a laser medium, said laser medium optically disposed between said mirror and said output coupler, said mirror, output coupler, and said laser medium forming a resonating cavity for supporting lasing, said laser medium generating a first laser beam having a fundamental frequency, and a first, second, and third nonlinear crystal disposed within said resonating cavity, wherein said first nonlinear crystal is adapted to interact with said first laser beam thereby generating a second laser beam having a harmonic frequency twice that of said fundamental frequency, and wherein said second nonlinear crystal is adapted to mix said first and second laser beams thereby generating a third laser beam having a harmonic frequency three times that of said fundamental frequency, and wherein said third nonlinear crystal is adapted to mix said third laser beam with said first laser beam thereby generating a fourth laser beam having a harmonic frequency four times that of said fundamental frequency.

24. The laser of claim 23, further including a modulator disposed within said resonating cavity.

25. The laser of claim 24, further including a polarization rotator and a beam recombiner optically disposed within said resonating cavity.

26. The laser of claim 23, wherein said second nonlinear crystal is optically disposed between said first nonlinear crystal and said laser medium and wherein said first nonlinear crystal is disposed between said second nonlinear crystal and said output coupler.

27. The laser of claim 26, further including a subresonating mirror optically disposed between said first nonlinear crystal and said laser medium.

28. The laser of claim 27, wherein said subresonating mirror, in conjunction with said output coupler, forms a subresonating cavity within said resonating cavity, and wherein said subresonating mirror is adapted to transmit said first laser beam and wherein said subresonating mirror is adapted to reflect said second laser beam.

29. The laser of claim 27, further including a polarizer disposed between said laser medium and said subresonating mirror.

30. The laser of claim 27, further including a quarter wave plate disposed between said output coupler and said laser medium.

31. The laser of claim 23, further including a subresonating mirror optically disposed between said second nonlinear crystal and said laser medium.

32. The laser of claim 31, further including a polarizer disposed between said laser medium and said subresonating mirror.

33. The laser of claim 31, further including a quarter wave plate disposed between said output coupler and said laser medium.

34. An intra-cavity high order harmonic laser comprising:

a mirror, an output coupler, a laser medium, and a laser pump, said laser medium optically disposed between said mirror and said output coupler, said mirror, output coupler, and said laser medium forming a resonating cavity for supporting lasing, said laser medium generating a first laser beam having a first fundamental frequency, and wherein said laser pump generates a pump beam having a second fundamental frequency, and a first and second nonlinear crystal disposed within said resonating cavity, wherein said first nonlinear crystal is adapted to operate on said pump beam thereby generating a second laser beam having a harmonic frequency twice that of said second fundamental frequency of said pump beam, and wherein said second nonlinear crystal is adapted to mix said second laser beam with at least one of said pump beam and said first laser beam thereby generating a third laser beam having a harmonic frequency.

35. The laser of claim 34, wherein said second laser beam mixes with said first laser beam and wherein said harmonic frequency of said third laser beam is equal to the sum of the first fundamental frequency plus twice the second fundamental frequency.

36. The laser of claim 34, wherein said second laser beam mixes with said first laser beam and wherein said harmonic frequency of said third laser beam is equal to the absolute value of the difference between twice the second fundamental frequency minus the fundamental frequency.

37. The laser of claim 34, further including a modulator disposed within said resonating cavity.

38. The laser of claim 34, wherein said second nonlinear crystal is optically disposed between said first nonlinear crystal and said laser medium and wherein said first nonlinear crystal is disposed between said second nonlinear crystal and said output coupler.

39. The laser of claim 38, further including a subresonating mirror optically disposed between said second nonlinear crystal and said laser medium.

40. The laser of claim 39, wherein said subresonating mirror, in conjunction with said output coupler, forms a subresonating cavity within said resonating cavity, and wherein said subresonating mirror is adapted to transmit said first laser beam and wherein said subresonating mirror is adapted to reflect said second laser beam.

41. The laser of claim 39, further including a polarizer disposed between said laser medium and said subresonating mirror.

42. The laser of claim 39, further including a quarter wave plate disposed between said output coupler and said laser medium.

43. The laser of claim 34, further including a subresonating mirror optically disposed between said second nonlinear crystal and said laser medium.

44. The laser of claim 43, further including a quarter wave plate disposed between said output coupler and said laser medium.

45. The laser of claim 34, further including, a polarizer disposed between said laser medium and said subresinating mirror.

46. The laser of claim 34, further including a polarization rotator and a beam recombiner optically disposed within said resonating cavity.

47. An intra-cavity high order harmonic laser comprising:
a mirror, an output coupler, a laser medium, and a laser pump, said laser medium optically disposed between said mirror and said output coupler, said mirror, output coupler, and said laser medium forming a resonating cavity for supporting lasing, said laser medium generating a first laser beam having a first fundamental frequency, and wherein said laser pump generates a pump beam having a second fundamental frequency, and
a first and second nonlinear crystal disposed within said resonating cavity, wherein said first nonlinear crystal is adapted to operate on said first laser beam and said pump beam thereby generating a second laser beam having a harmonic frequency equal to the sum of said first and second fundamental frequencies, and wherein said second nonlinear crystal is adapted to mix said second laser beam with at least one of said pump beam and said first laser beam thereby generating a third laser beam having a harmonic frequency.

48. The laser of claim 47, further including a subresonating mirror optically disposed between said second nonlinear crystal and said laser medium.

49. The laser of claim 48, further including a polarizer disposed between said laser medium and said subresonating mirror.

50. The laser of claim 48, further including a quarter wave plate disposed between said output coupler and said laser medium.

51. The laser of claim 47, wherein said second laser beam mixes with said pump beam and wherein said harmonic frequency of said third laser beam is equal to twice the second fundamental frequency plus the first fundamental frequency.

52. The laser of claim 47, wherein said second laser beam mixes with said first laser beam and wherein said harmonic frequency of said third laser beam is equal to the sum of the second fundamental frequency plus twice the first fundamental frequency.

53. The laser of claim 47, further including a modular disposed within said resonating cavity.

54. The laser of claim 47, wherein said second nonlinear crystal is optically disposed between said first nonlinear crystal and said laser medium and wherein said first nonlinear crystal is disposed between said second nonlinear crystal and said output coupler.

55. The laser of claim 54, further including a subresonating mirror optically disposed between said second nonlinear crystal and said laser medium.

56. The laser of claim 55, wherein said subresonating mirror, in conjunction with said output coupler, forms a subresonating cavity within said resonating cavity, and wherein said subresonating mirror is adapted to transmit said first laser beam and wherein said subresonating mirror is adapted to reflect said second laser beam.

57. The laser of claim 55, further including a polarizer disposed between said laser medium and said subresonating mirror.

58. The laser of claim 55, further including a quarter wave plate disposed between said output coupler and said laser medium.

59. The laer of claim 47, further including a polarization rotator and a beam recombiner optically disposed within said resonating cavity.

* * * * *